US009558611B2

(12) United States Patent
Watkins et al.

(10) Patent No.: US 9,558,611 B2

(45) Date of Patent: Jan. 31, 2017

(54) WAGERING GAME, GAMING MACHINE, NETWORKED GAMING SYSTEM AND METHOD WITH NUDGING RE-SPINNING STACKED WILDS

(75) Inventors: Brian A. Watkins, Austin, TX (US); Clint Owen, Austin, TX (US); J P Cody, Austin, TX (US)

(73) Assignee: Everi Games Inc., Austin, TX (US)

( * ) Notice: Subject to any disclaimer, the term of this patent is extended or adjusted under 35 U.S.C. 154(b) by 0 days.

(21) Appl. No.: 13/220,405

(22) Filed: Aug. 29, 2011

(65) Prior Publication Data

US 2012/0295688 A1 Nov. 22, 2012

Related U.S. Application Data

(60) Provisional application No. 61/413,462, filed on Nov. 14, 2010.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.

CPC ....... *G07F 17/3211* (2013.01); *G07F 17/3213* (2013.01); *G07F 17/3244* (2013.01); *G07F 17/3267* (2013.01); *G07F 17/34* (2013.01)

(58) Field of Classification Search

CPC .. G07F 17/34; G07F 17/3213; G07F 17/3211; G07F 17/3265; G07F 17/3244; G07F 17/3267

USPC ................................... 463/16, 20; 273/143 R

See application file for complete search history.

(56) References Cited

U.S. PATENT DOCUMENTS

| | | | | |
|---|---|---|---|---|
| 4,200,291 | A | 4/1980 | Hooker | |
| 4,790,537 | A | 12/1988 | Smyth et al. | |
| 4,836,546 | A * | 6/1989 | DiRe et al. | 463/18 |
| 5,449,173 | A | 9/1995 | Thomas et al. | |
| 5,704,835 | A | 1/1998 | Dietz, II | |
| 6,439,993 | B1 | 8/2002 | O'Halloran | |
| 6,676,512 | B2 | 1/2004 | Fong et al. | |
| 6,702,670 | B2 | 3/2004 | Jasper et al. | |
| 7,056,213 | B2 | 6/2006 | Ching et al. | |
| 7,074,127 | B2 | 7/2006 | Cuddy et al. | |
| 7,090,580 | B2 | 8/2006 | Rodgers et al. | |
| 7,094,148 | B2 | 8/2006 | Baerlocher et al. | |
| 7,195,559 | B2 | 3/2007 | Gilmore et al. | |
| 7,252,589 | B1 | 8/2007 | Marks et al. | |
| 7,331,862 | B2 | 2/2008 | Rodgers et al. | |

(Continued)

*Primary Examiner* — Omkar Deodhar

*Assistant Examiner* — Wei Lee

(74) *Attorney, Agent, or Firm* — Nathan Calvert, Esq.; Russell Culbertson, Esq.; J P Cody, Esq.

(57) ABSTRACT

A system, apparatus, and method are disclosed with one or more stacked wild symbols which when appearing, trigger one or more re-spins wherein stacked wild symbols are locked in place for at least one re-spin. Awards are paid following each game outcome. In the event that a portion of a stacked wild symbol is displayed as part of a game outcome, the associated reel may nudge upward or downward to shift the entire stacked wild symbol into view, awards are then paid on the winning outcomes, and one or more re-spins may ensue with any displayed stacked wild symbols being locked for at least one subsequent re-spin.

17 Claims, 8 Drawing Sheets

(56) References Cited

U.S. PATENT DOCUMENTS

| | | | |
|---|---|---|---|
| 7,331,866 | B2 | 2/2008 | Rodgers et al. |
| 7,481,708 | B2 | 1/2009 | Baerlocher et al. |
| 2002/0039919 | A1 * | 4/2002 | Joshi et al. .................... 463/20 |
| 2003/0054872 | A1 * | 3/2003 | Locke et al. .................... 463/20 |
| 2004/0033827 | A1 * | 2/2004 | Gilmore et al. ................ 463/20 |
| 2004/0036218 | A1 * | 2/2004 | Inoue ............................ 273/292 |
| 2004/0048650 | A1 | 3/2004 | Mierau et al. |
| 2006/0046830 | A1 * | 3/2006 | Webb .............................. 463/20 |
| 2006/0068885 | A1 | 3/2006 | Cregan et al. |
| 2006/0189377 | A1 | 8/2006 | Gomez et al. |
| 2006/0264254 | A1 * | 11/2006 | Aoki ............................... 463/20 |
| 2007/0066391 | A1 | 3/2007 | Kojima |
| 2007/0287529 | A1 * | 12/2007 | Kojima ........................... 463/20 |
| 2008/0039184 | A1 | 2/2008 | Inamura |
| 2008/0064465 | A1 | 3/2008 | Bennett |

* cited by examiner

WAGERING GAME, GAMING MACHINE, NETWORKED GAMING SYSTEM AND METHOD WITH NUDGING RE-SPINNING STACKED WILDS

CROSS-REFERENCE TO RELATED APPLICATION

The Applicants claim the benefit, under 35 U.S.C. §119 (e), of U.S. Provisional Patent Application No. 61/413,462 filed Nov. 14, 2010, and entitled "Wagering Game, Gaming Machine, Networked Gaming System and Method With Nudging Re-Spinning Stacked Wilds."

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent files or records, but otherwise reserves all rights of copyright whatsoever.

FIELD OF THE INVENTION

This invention relates to wagering games, gaming machines, networked gaming systems and associated methods. More particularly, the invention relates to wagering games, gaming devices, networked gaming systems, and associated methods including stacked wild symbols.

BACKGROUND OF THE INVENTION

A large number of different gaming machines have been developed to provide various formats and graphic presentations for conducting games and presenting game results.

There continues to be a need to generate more player interest and excitement by providing new aspects to games.

SUMMARY OF THE INVENTION

The present invention includes wagering games, gaming machines, networked gaming systems and methods with one or more stacked wild symbols which when appearing, trigger one or more re-spins wherein stacked wild symbols are locked in place for at least one re-spin. Awards are paid following each game outcome.

In the event that a portion of a stacked wild symbol is displayed as part of a game outcome, the associated reel may nudge upward or downward to shift the entire stacked wild symbol into view, awards are then paid on the winning outcomes, and one or more re-spins may ensue with any displayed stacked wild symbols being locked for at least one subsequent re-spin.

These and other features of the invention will be apparent from the following description of the preferred embodiments, considered along with the accompanying drawings.

DETAILED DESCRIPTION OF PREFERRED EMBODIMENTS

Figure 1A:
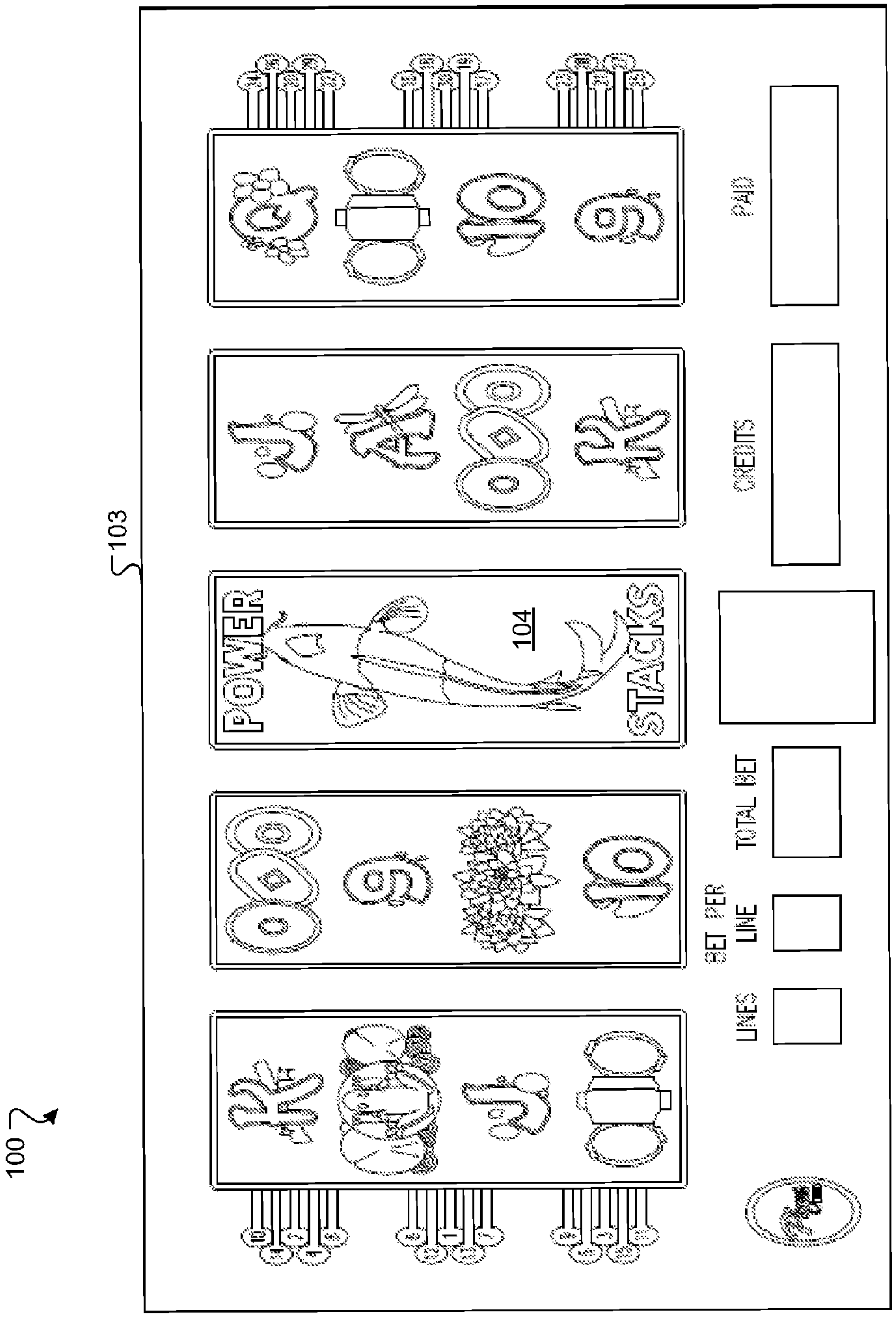
FIG. 1A is an example screenshot of primary display 100 including example reel game 103 (Multimedia Games' Koi Pond) with a stacked wild symbol triggering one or more re-spins with the stacked wild symbol locked in position in accordance with one or more embodiments.
Figure 1B:
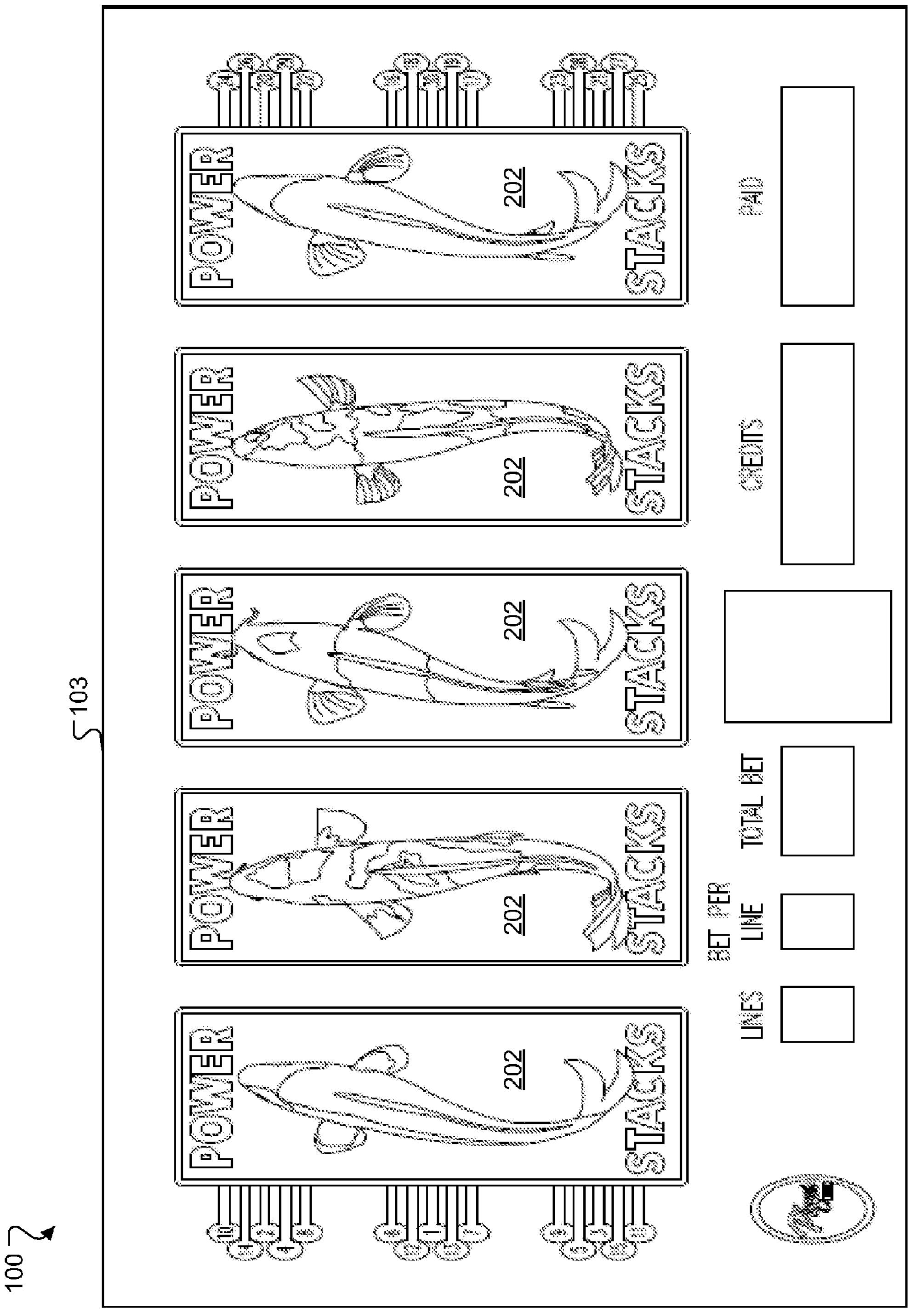
FIG. 1B is an example screenshot of primary display 100 including example reel game 103 (Multimedia Games' Koi Pond) with a stacked wild symbol displayed on each reel resulting in the top paytable winning award in accordance with one or more embodiments.

Referring to FIG. 1 (and generally FIG. 1A, 1B), example primary display 100 is shown displaying reel game 103 (Multimedia Games' Koi Pond) with a stacked wild symbol appearing in a primary game display area in accordance with one or more embodiments.

In one or more embodiments, each reel may include at least one stacked wild symbol. For example, if a display window includes three symbol locations for a given reel, then the stacked wild symbol associated with the reel may comprise three symbol locations. When a stacked wild symbol (or power stack) appears as part of a game outcome, a power stack sound or sounds may be played and the reel may be illuminated with a colored lighting effect (e.g. blue). In the event that a portion of a stacked wild symbol appears as part of a game outcome, the associated reel may nudge (or turn) upward or downward to fully display the stacked wild symbol in the display window. A game processor may then pay awards on any active winning paylines and re-spin all the reels except any reel with a stacked wild symbol appearing in the display window which remains locked in position (i.e. all non-wild reels re-spin). Once the reels stop, the processor pays any additional winning outcomes; and, in the event that another stacked wild symbol appears, the process is repeated until no additional stacked wild symbols appear during a subsequent re-spin or all reels show a stacked wild symbol (e.g. FIG. 1A), at which point the active winning paylines are paid and the game reverts to standby mode until another game is initiated by a player. As additional stacked wild symbols appear, each associated reel may be illuminated with a colored lighting effect which may be the same or different from other reels with stacked wild symbols appearing. During re-spins, a re-spin sound or sounds may be played and video animations may be displayed on one or more displays associated with the game.

In one or more embodiments, if a stacked wild symbol or a portion thereof appears, the entire reel may be transformed (or treated as if transformed) into a stacked wild symbol (or successive stacked wild symbols), so that the reel symbols on the reel are wild for every possible payline. For example, if the reels are video reels or the reels are mechanical reels with programmable symbols (e.g. FOLED displays), upon the appearance of a stacked wild symbol or portion thereof, the associated reel or reels may transform entirely into a stacked wild or successive stacked wilds, and once the process as described above is completed, then the symbol locations of each reel may revert to their normal symbols.

In one or more embodiments, one or more reels may include one or more individual wild symbols. In the event that a portion of a wild may appear on a display in an initial game outcome, the reel may nudge downward or upward to shift the wild symbol into a location fully visible within the display window in a final game outcome and the processor may pay active winning paylines of the final outcome. In one or more embodiments, one or more additional spins (or re-spins) may be provided with the reel including the visible wild symbol remaining locked and then the processor may pay awards for the subsequent game outcomes. If another wild symbol appears, the process may be repeated until no additional wild symbols appear or until all reels show a wild symbol at which point either a large award or jackpot may be paid and/or a feature game may be triggered (e.g. a wheel top box game, FIG. 2B). In an alternative embodiment, when a wild symbol appears in the display window, the winning active paylines may be paid and a re-spin (or free spin) may occur for all the reels, and when the reels stop, the symbol location where the wild symbol previously was displayed in the display window may have the subsequently appearing symbol transformed into a wild symbol to improve the award win.

In one or more embodiments, one or more reels may include one or more free spin symbols and the appearance of two or more free spin symbols (e.g. scattered appearances within the display window) may trigger one or more free spins. In the event that a stacked wild symbol is displayed or partially displayed, the associated reel may nudge upward or downward to fully display the stacked wild symbol and the reel may lock in position during the remaining free spins. In one or more embodiments, one or more additional free spins (or re-spins) may be provided for each appearance of a stacked wild in a game outcome. In one or more alternative embodiments, reel locking may only occur if all reels to the left are already locked due to the appearance of a stacked wild (e.g. reel 1 may first have a stacked wild appear and lock for a subsequent spin, before reel 2 or any other reel may have a stacked wild appear and lock for a subsequent spin).

In one or more embodiments, one or more reels may include a multiplier symbol, such that when at least one multiplier symbol appears on an active payline, an award may be paid (such as 2× the bet for one multiplier symbol, 5× the bet for two multiplier symbols, 200× the bet for three multiplier symbols), and then one or more re-spins may be provided of the reels with no multiplier symbol displayed (i.e. locking the reel/s with a multiplier in position), the subsequent winning outcomes may be paid, and if another multiplier symbol is displayed then one or more re-spins may be provided.

In one or more embodiments, an additional wager may be required when betting the paylines in order to activate the re-spin feature.

In one or more embodiments, a processor may randomly or pseudo-randomly determine a game outcome and either the same processor or another one may randomly or pseudo-randomly determine a game presentation to be displayed in accordance with the determined game outcome. In one or more alternative embodiments the determination of the game presentation to be provided may comprise a pseudo-random determination wherein weighting of possible game presentations may be applied based on historical game presentations to increase the possibility of selecting a game presentation that has been selected less frequently than other game presentations associated with the same award level. For example, the processor may use historical data showing that a prize was paid out via bonus A, a few spins previously, whereas it has been a much larger number of spins since bonus B was displayed, then a weighting algorithm may be applied to skew a default split of 70%/30% (bonus A/bonus B) to another ratio of perhaps 30%/70% to increase the likelihood that bonus B will be selected as a game presentation to increase variety of game presentations selected for the same value award.

In one or more embodiments, a first triggered number of free spins (or re-spins) may be a default of two, and if another free spin triggering event occurs during the first set of re-spins (or free spins), then the number of additional free spins (or re-spins) may be an increased number, such as four additional free spins (or re-spins), and so forth as additional free spin (or re-spin) triggering events occur during the same game sequence, where a game sequence may be defined as a set of games including feature or bonus games which are played as the result of a single wager (e.g. 100 credits placed on 20 lines at 5 credits/line).

In one or more embodiments, a default multiplier (e.g. 2× of the paytable award or wager) may be applied following triggering of one or more free spins (or re-spins). In one or more further embodiments, the default multiplier may increase (e.g. to 5×) when another re-spin (or free spin) trigger occurs during the same game sequence, and so forth. Alternative to increasing the multiplier by a set amount for a triggered set of re-spins (or free spins), the multiplier may be increased by a randomly or pseudo-randomly determined amount. The default multiplier may also be randomly generated during each game sequence when a re-spin or free spin trigger occurs.

In one or more embodiments, a feature game may be initiated by a re-spin trigger in a base game 103 (e.g. the wheel game in top box 227 wherein the wheel segments may be multipliers of a base game award, awards, free spins, re-spins, or a combination thereof). In another alternative, when free spins are triggered, two or more selectable icons or symbols (respectively associated with two or more feature games) may be displayed and a player may be provided an opportunity to select one icon which may initiate one of the feature games. Once selected, either primary display 100 or display 110 may transform to display the selected feature game and provide the free spin game presentations. In one or more embodiments, the feature games may have a trigger that may initiate one or more spins of one or more wheel games which may be provided through programming a dynamic wheel display on wheel top box 227, wherein the various wheel segments may or may not be varied from spin-to-spin to provide for fixed and/or progressive awards, multipliers of the feature game award outcome, additional spins of either the feature or base game, or combinations thereof.

In one or more embodiments, a wager may be placed by a player at a selected denomination (e.g. $0.01) and play initiated on a base game accordingly which may trigger a feature game play, the feature game play may include increasing the denomination of the game (e.g. $1) which may then be converted by the processor to the original credit denomination (e.g. $0.01).

An active payline is one that is wagered upon by a player during a game play; and a winning outcome (or payline) is an active payline upon which a game outcome is associated with an award, such as the game outcomes and associated awards shown in paytable 105. In example reel game 103, winning outcomes are three, four, or five sequential symbols as identified in paytable 105 which occur on any active payline and may include wild symbols that may substitute for any symbol.

FIG. 1B is an example screenshot of primary display 100 including example reel game 103 (Multimedia Games' Koi Pond) with a stacked wild symbol displayed on each reel resulting in the top paytable winning award in accordance with one or more embodiments.

Figure 1C:
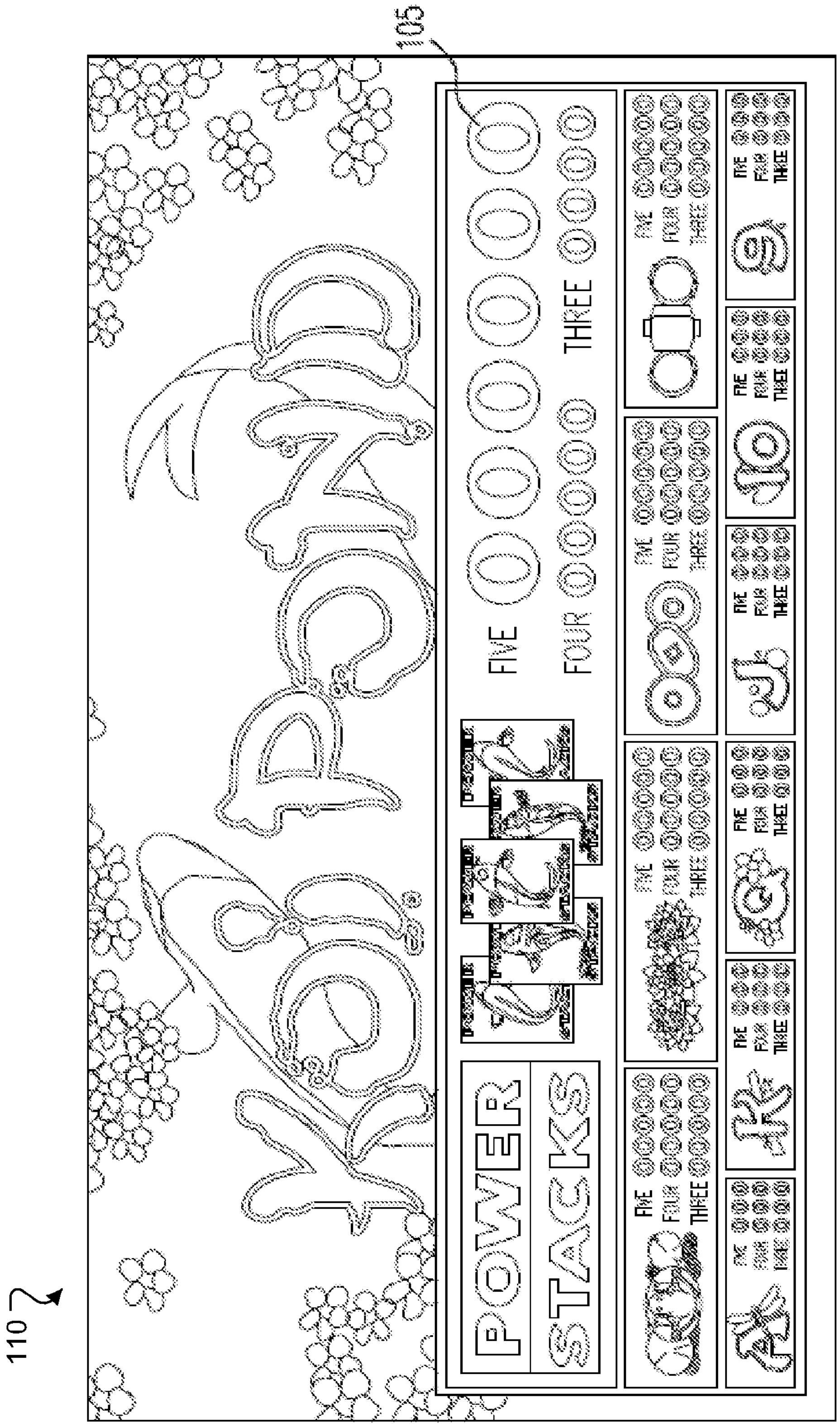
FIG. 1C is an example screenshot of upper display 110 including another example paytable 105 (Koi Pond) listing various outcome combinations and associated awards paid on three, four, or five of a kind in accordance with one or more embodiments.

FIG. 1C is an example screenshot of upper display 110 including another example paytable 105 (Koi Pond) listing various outcome combinations and associated awards paid on three, four, or five of a kind in accordance with one or more embodiments.

Figure 2A:
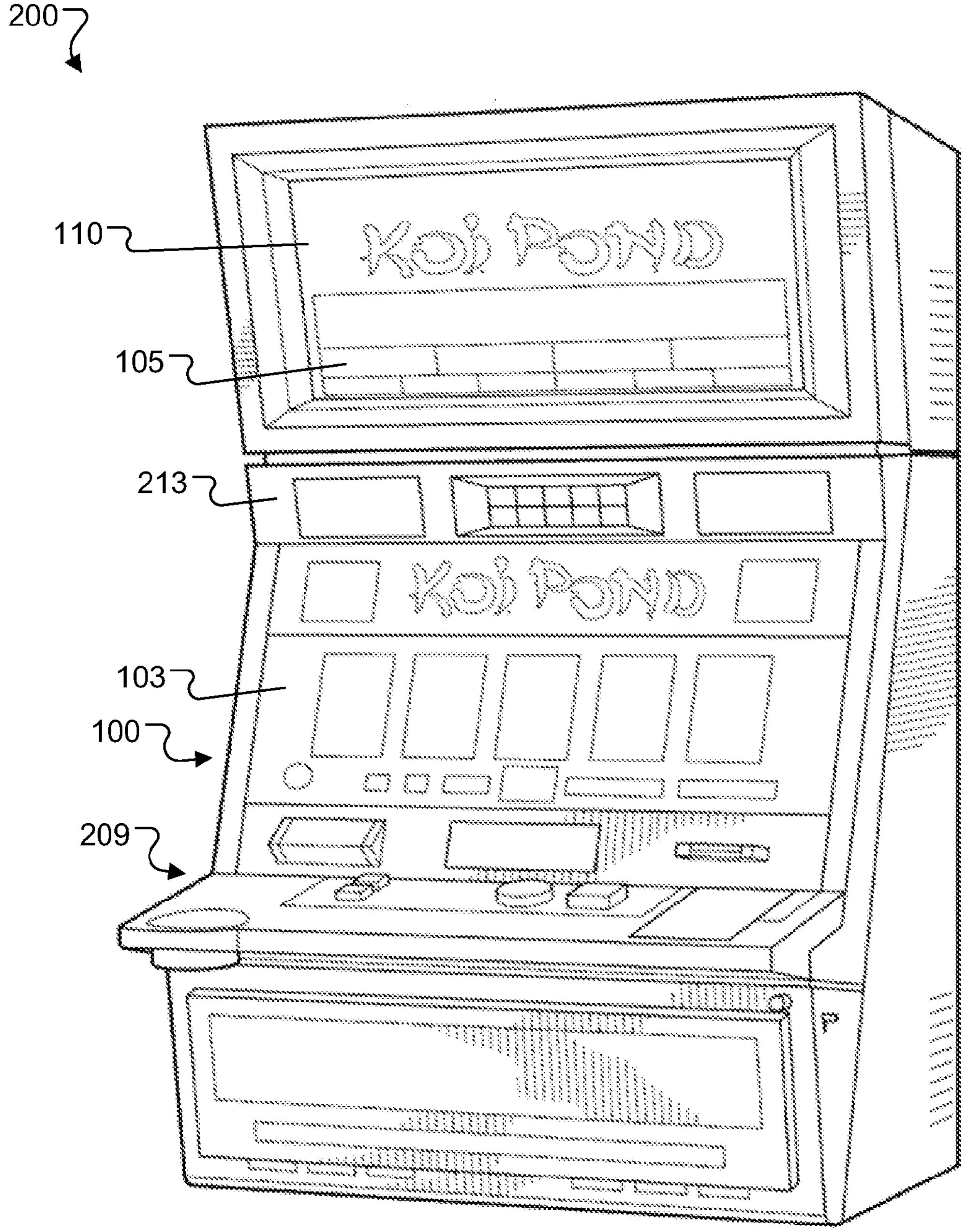
FIG. 2A illustrates example upright gaming machine 200 (Multimedia Games Koi Pond) in accordance with one or more embodiments.
Figure 2B:
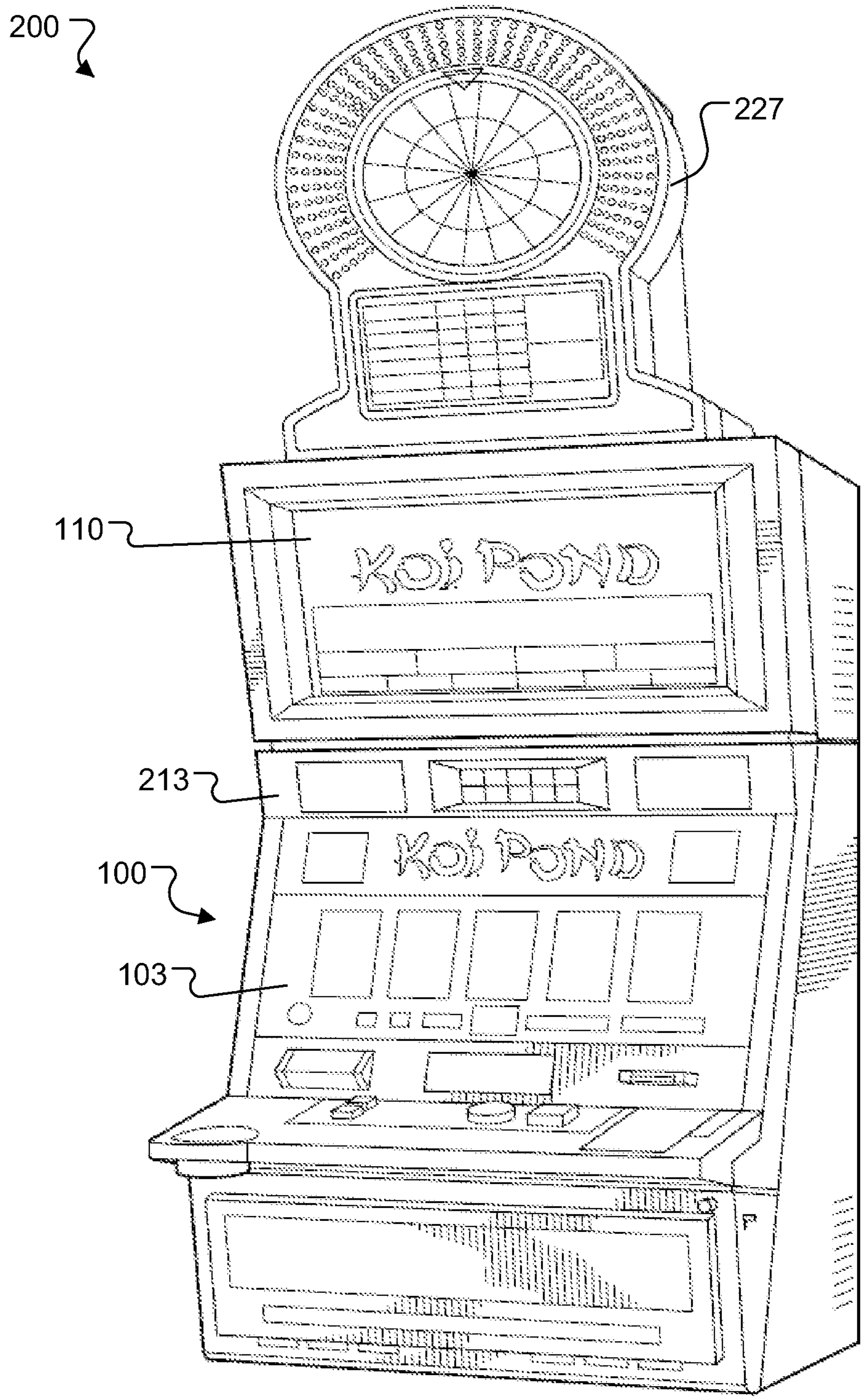
FIG. 2B illustrates another upright gaming machine including a wheel top box according to one or more embodiments.

Referring now to FIG. 2A (and generally, FIGS. 2B and 2C), gaming machine 200, such as Multimedia Games' Koi Pond gaming machine, is shown including primary display 100 with which a set of reels are depicted in a base game display area to implement the reel based game described above in accordance with one or more embodiments. As shown, upper display 110 may be shown with paytable 105 displayed. Alternatively, upper display 110 may be replaced (or another display may be added) such as with wheel top box 227 shown in FIG. 2B. As another alternative, a paytable may be displayed on display 100 in the informational display area (or on another available display), such as by rotating content periodically or be provided through the help screen.

Gaming machine 200 is also shown to include middle display 213 which may display a server-based game (such as bingo, in the case of a Class II gaming machine), advertising or other content as may be provided over a network or through the gaming machine; and, user interface 209 with which a patron may place wagers and initiate play of one or more games at gaming machine 200, all of which is housed in or about a gaming machine cabinet. User interface 209 may include: a commercially available player tracking interface unit, such as a Bally iView unit; a button deck including buttons for selecting paylines and wagers per payline on base game 103, one or more additional buttons for selecting wagers associated with one or more side games that may be included in the base game display area 103 or middle or upper displays 213 or 110, and, a 'Play' button and/or handle with which the player may use to initiate play of the games selected by the player. The button deck may be provided on a touch panel (such as on the lower portion of display 100) in addition to or in the alternative to a physical button deck. The 'Play' button may also be useable to, simultaneously with base game 103 or separately (if the option is provided to play only a side game), initiate play of a side game. The player tracking unit may include a card reader, a bill acceptor/printer, and player display which may include a greeting to the player, player points, a menu for communicating with player account server 409, and other casino operator content.

While gaming machine 200 is shown as an upright gaming machine cabinet style (FIGS. 2A-2B), various cabinet styles or device types may be utilized including a slant top cabinet style (for example, FIG. 2C), a bar top cabinet style (where the cabinet may be part of a bar/table top and/or housed therein), a personal computer, or, a tablet, cell phone or other handheld device.

Figure 2C:
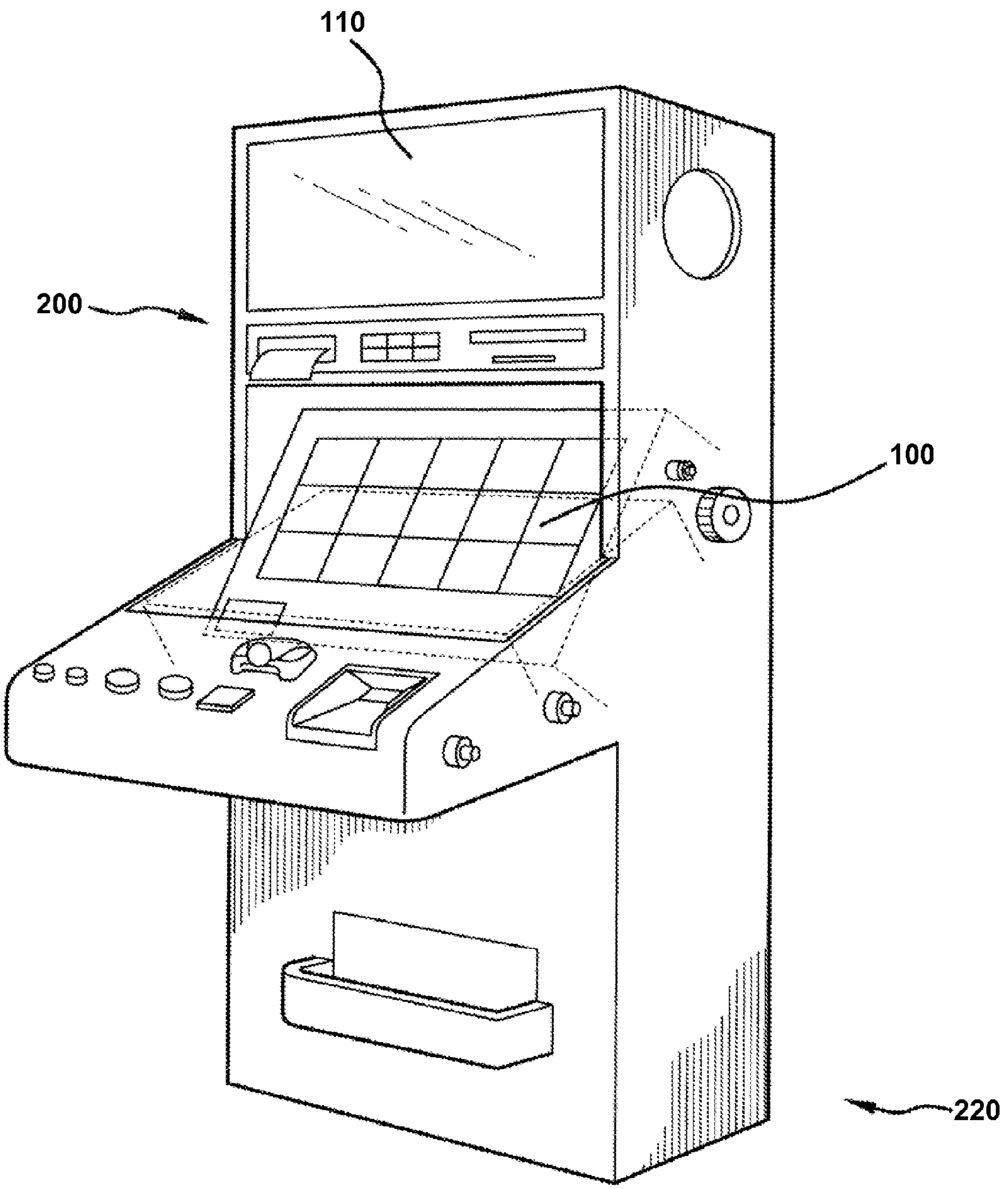
FIG. 2C illustrates a gaming machine having a slant top style cabinet according to one or more alternative embodiments.

FIG. 2C shows a gaming machine having a slant top style cabinet according to one or more alternative embodiments. The depicted gaming machine 200 includes a slant top style cabinet 220, housing an upper display 110 and a primary display 100, each having the functions already described above. In some slant top style embodiments, primary display 100 is movable or adjustable between two positions indicated by the two dotted outlines depicting primary display 100.

As in the reel games shown in the figures, each reel includes a series of symbols (for example, as shown in FIG. 1A) viewable in display 100 (e.g. through a glass window or transparent display, in the case of mechanical reels, or, as displayed in a video format). With the reels in a stationary position, the symbols visible on the depicted reels may be viewed as an array of symbols. During a wagering game (as may be initiated by a player by placing a wager and pressing a 'PLAY' button), the reels may be simulated to spin (or electro-mechanically spun in the case of mechanical reels) about an axle under the control of a game processor which randomly or pseudo-randomly determines the game outcome and causes the reels to stop in accordance with the determined game outcome.

One or more paylines, combinations, or patterns of the symbols including those visible in display 100 may be correlated to one or more game outcomes on active paylines and payable in accordance with paytable 105. A patron may wager on one or more of the paylines during each game play (active paylines). Display 100 may thereby be used to display game results to one or more patrons who may view gaming machine 200 and the game processor may make payment to the patron by incrementing a credit meter (or a player's account or directly paying) for winning outcomes of paylines in accordance with the paytable and upon which the patron has wagered. In example gaming machine 200, various paylines are provided across the five reels; a player may be provided the option to bet one, two, three, or more credits on each payline to play base game 103.

Primary display 100 may comprise a single display or may comprise two or more displays (e.g. two displays in over- or under-laying relation to each other). For example, primary display 100 may comprise a touch-sensitive display panel, such as a flat panel LCD or LED display, which may be programmed to display an opaque or thematic frame image (which may include video and/or still images) except over a reel display area. Primary display 100 may be programmed to be transparent or translucent during game play of the primary wagering game, so that the patron may view the game presentation in the reel display area where a set of mechanical reels may be viewable or a set of video reels may be displayed by an underlying display. In addition, the entire display surface of primary display 100 (or a portion thereof) may be configured to respond to the patron's touch such as to select paylines, select credits wagered per payline, and/or play reel game 103.

In one or more alternative embodiments, primary display 100 may be programmed to display a bonus or feature game that may be triggered by the appearance of one or more special symbols or other random event. In one or more embodiments, when a bonus or feature game is triggered, primary display 100 (or a portion thereof) may be transformed to display content associated with the bonus or feature game and once the bonus or feature game is complete, primary display 100 may revert to the primary game display state.

In one or more alternative embodiments, a touch sensitive portion of display may be programmed to display a player interactive element such as, for example, by displaying a selection of buttons and displaying a message to the player to 'choose a button' which is implemented to enable player interactivity with the game, such as to select a displayed button or item, in order to cause the game to perform additional steps and/or provide one or more bonus or feature game outcomes and awards to the player.

In one or more alternative embodiments, gaming machine 200 may include mechanical reels with fixed or dynamic symbols. Conventionally, mechanical reels include reel strips with fixed symbols; however, reel strips may be, for example, implemented using FOLED (flexible organic LED) or comparable reel strips wherein one or more symbols may be programmed dynamically to vary the symbol and/or its appearance, either from one fixed image to another (such as changing a symbol to a wild symbol or changing a series of symbols to wild symbols), or, from a fixed image to a dynamic (e.g. animated or video) image or a set of miniature video reels. In various instances when a symbol changes to another symbol, a bonus or enhanced award may be paid in accordance with the paytable or a multiple thereof or may be a bonus (a fixed or progressive amount) paid separate from the paytable.

In the event that the payment is a progressive, a progressive pool may be generated from an operator's marketing dollars or from play at one or more gaming machines which may be eligible for the progressive award; and the progressive pool may be maintained by progressive server 407. In cases when a progressive is associated with an individual gaming device, the progressive pool may be maintained through a processor (such as the game processor) associated with the device. In cases when the progressive associated with a game is personal to the player, the amount of the progressive award may be maintained by a processor associated with the game while the player is playing the particular device, and when the player's gaming session ends, the amount accumulated towards the personal progressive award, if not won, may be forwarded to a server, such as player account server 409, which may forward the information to a subsequent device when the player returns to play or selects another gaming machine on which to play.

Another conventional game display approach is to implement reels virtually (video reels) on a display, such as primary display 100 as shown in the figures discussed herein. In the case of virtual displays of the reels, the symbols may be fixed or animated on each of the reels. In one or more embodiments, a multiplier symbol may appear on a winning payline or as a scatter symbol in base game 103, which may trigger another game (such as wheel top box 227, FIG. 2B or a game displayed on one of the associated displays) to modify one or more awards associated with an original game outcome with a multiplier value (e.g. 1×, 2×, 3×, etc.) and/or one or more free base game spins. For example, a multiplier game may provide a game presentation and outcome, and based on the outcome, an associated multiplier award may be applied to one or more paylines on reel game 103 to determine the award that is paid to the player (e.g. credited to a credit meter on the gaming machine), which may be based on the currently displayed outcome and/or one or more free base game plays. If two or more multiplier symbols appear in reel (or base) game 103, the multipliers associated with the multiplier game paytable may be multiplied by two or more. In another example, one or more free spin symbols may appear on base game 103 which may trigger a free spin game to award a number of free spins of base game 103 depending on the free spin game outcome. The associated number may be multiplied by the number of free spin symbols that appeared on base game 103 to trigger the free spin game; and, the free spin game process may be repeated to add to the number of remaining base game free reel spins, if one or more free spin symbols appear on subsequent base game plays.

In one or more embodiments, a player may be provided an option to save a multiplier or number of free spins, as described above, for use at a later time in the gaming session or if the player doesn't use the multiplier or number of free spins during the gaming session, the multiplier and free spin information may be transmitted to a server, such as player account server 409, stored, and then transmitted from the server to a gaming device selected by the player at a later time (e.g. the player may enter a player card into a gaming device card reader, which then communicates with player account server 409 to receive player information including any saved game information). In one or more embodiments, the multiplier and free spins may be used with the same game as previously played or, in some cases, may be used with one or more other games (such as games of the same denomination). In one or more embodiments, saved multipliers and/or free spins may be increased, such as by hitting a multiplier or free spin win additional times. For example, a player may win a 2× multiplier on a first win and subsequently win a 3× multiplier on a second win. A player may be able to then play a game with the 2× multiplier and play another game with the 3× multiplier. Alternatively, the multipliers may accumulate 2×+3×=5× and the player may play a single game with a 5× multiplier. In one or more embodiments, the player may be provided the option to split up the multipliers in two or more games or play the multipliers in a single game. In a case when a player has accumulated multipliers totaling 6× or more, a player may have the option to split the multipliers into two games (e.g. 2×, 4× or 3×, 3×) or three (e.g. 2×, 2×, 2×) games or to play the accumulated multiplier in a single game.

In one or more alternative embodiments, overlapping display panels may be implemented to generate video or display effects over the primary game reels. For example, the reel display area may be implemented as a transmissive (e.g. Aruze or WMS transmissive display panels) display or a transparent (e.g. Bally's transparent display panels) display configured to display visual effects together (or cooperatively) with the primary reels under the control of the game processor during the operation of a wagering game. In the case of virtual reels, the virtual reels may be recessed a distance from an overlaying display and segregated by dividers similar to dividers separating mechanical reels, which may provide a spatial characteristic (e.g. IGT's Pure-Depth display panels). In either case, the overlapping display may be touch sensitive and configured to interact with the player by transmitting and receiving signals as described above.

In one or more embodiments, the game processor operating the wagering game and interacting with various peripheral components in many instances is implemented as a microprocessor, such as an Intel Pentium microprocessor, on a printed circuit board including one or more memory devices positioned within gaming machine 200. In alternative implementations, the game processor may be remote from gaming machine 200, such as on a server network (e.g. game server 403) connected to gaming machine 200, in which case the game operation as described herein may be accomplished through network communications to control the display of the game on gaming machine 200.

Figure 3:
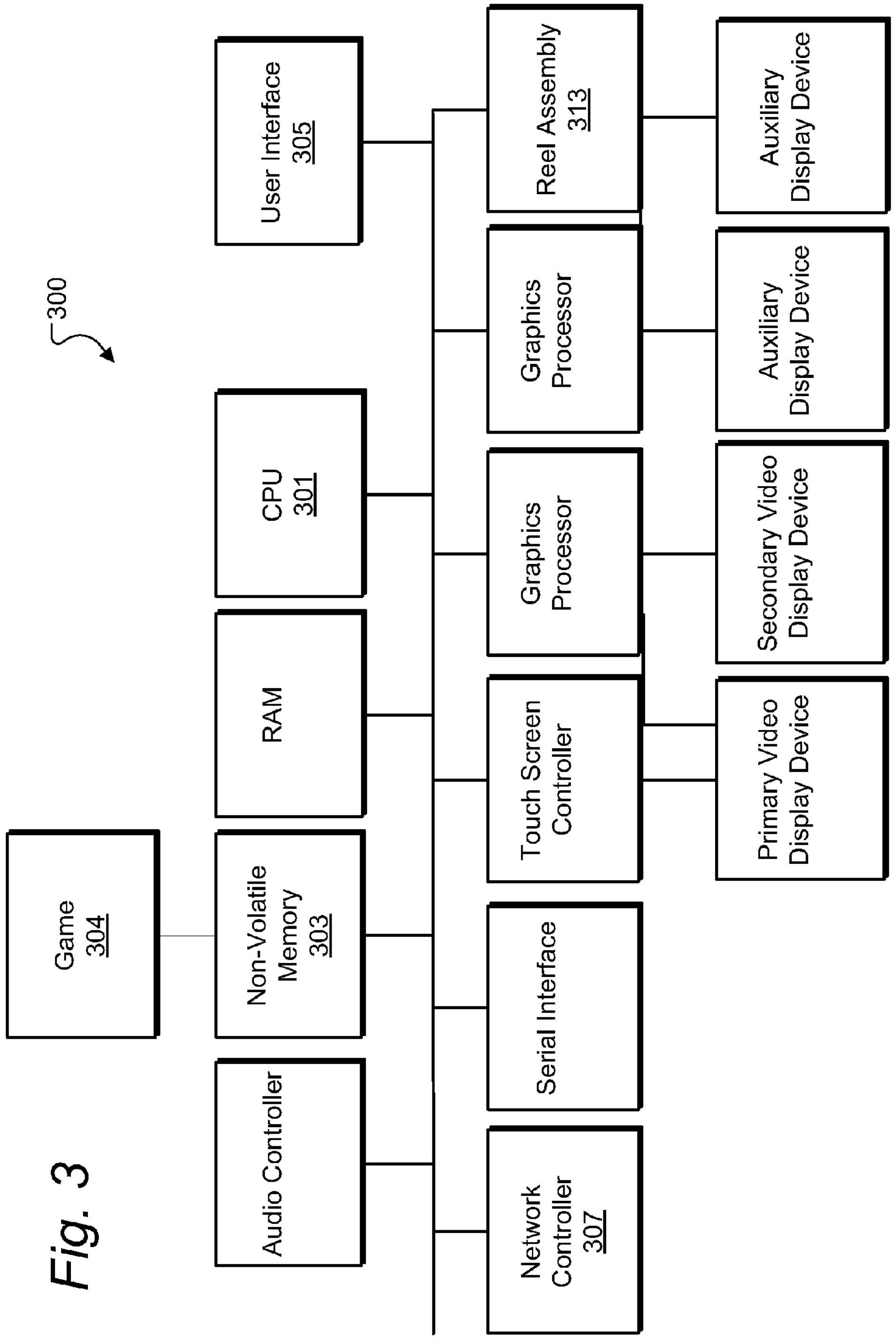
FIG. 3 illustrates an example logic diagram of a gaming machine in accordance with one or more embodiments.

Referring to FIG. 3, example logical diagram 300 of gaming machine 100 is shown including CPU 301, memory

303 with wagering game 304, user interface 305, network controller 307, audio/visual controllers, and reel assembly 313 (if mechanical reel configuration). Game processor (CPU) 301 may comprise a conventional microprocessor, such as an Intel Pentium microprocessor, mounted on a printed circuit board with supporting ports, drivers, memory, and coding to communicate with and control gaming machine operations, such as through the execution of coding stored in memory 303 including one or more wagering games 304. Game processor 301 connects to user interface 305 such that a player may enter input information and game processor 301 may respond according to its programming, such as to apply a wager and initiate execution of a game.

Game processor 301 also may connect through network controller 307 to a gaming network, such as example casino server network 400 (referring generally to FIG. 4) which may be implemented over one or more site locations and include host server 401, remote game play server 403 (which may be configured to provide game processor functionality including determining game outcomes and providing audio/visual instructions to a remote gaming device), central determinant server 405 (which may be configured to determine lottery, bingo, or other centrally determined game outcomes and provide the information to networked gaming machines 200 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 200), player account server 409 (which may be configured to collect and store player information and/or awards and to provide player information to gaming machines 200 after receiving player identification information such as from a player card), and accounting server 411 (which may be configured to receive and store data from networked gaming machines 200 and to use the data to provide reports and analyses to an operator). Through its network connection, gaming machine 200 may be monitored by an operator through one or more servers such as to assure proper operation, and, data and information may be shared between gaming machine 200 and respective of the servers in the network such as to accumulate or provide player promotional value, to provide server-based games, or to pay server-based awards.

Generally, activity at gaming machine 200 is initiated by a player inserting currency and/or a player card into a bill acceptor and card reader, respectively. Upon insertion, a signal is sent to game processor (CPU) 301. In the case of the insertion of a player card, the card reader transmits card information which is directed through network controller 307 to a player tracking server connected to the network. Player data is transmitted to gaming machine 200, responsive to the data game processor 301 may execute coding causing player data and a display (and possibly an audio) command to be transmitted to one of the video and/or audio controllers instructing the controllers to display player information on a respective display and possibly issue an audio greeting through one or more respective speakers. Concurrently, the bill acceptor sends a signal to game processor 301 which may include an identification of the currency that has been read, and game processor 301 in accordance with its coding may convert the currency amount to credits and transmit a store and display signal to a credit meter and its associated display ("Credits", e.g. FIG. 1A). Once credits have been associated with the credit meter, the player may select the number of paylines and credits per line that the player wishes to wager, whereupon game processor 301, in accordance with its coding, receives the wager information from user interface 305, transmits accounting and display information to the payline ("Lines"), credits per payline ("Bet Per Line), and total bet ("Total Bet") meters and displays, transmits an update to the credit meter and display ("Credits") deducting the amount of the total bet, and initiates the wagering game.

In the case of a Class III gaming devices, when a game is initiated, a random number generator (RNG) is operated by game processor 301 to determine the game outcome. Commonly, game processor 301 is positioned within gaming machine 200 and configured to manage the operation of the gaming machine components, such as shown in FIG. 3. However, the game processor may be either onboard or external to a gaming device played by a player, such as an electronic tablet (e.g. Apple iPad or gaming specific tablet), personal data assistant (PDA), cellular telephone (e.g. Blackberry or Apple iPhone), surface table (e.g. Microsoft/IGT touch sensitive gaming surface table), etc. In such case, when the player places a wager and initiates play of the game through user interface 305 of the gaming device, the game processor may be onboard or remotely located such as within a network gaming server. In the latter case, an onboard microprocessor, controller, or digital signal processor may execute coding to transmit the wager and game request information through the network and the remote game processor may operate an RNG to determine the game outcome.

In the case of Class II gaming devices, the overall structure of the various devices as discussed above is essentially the same with the major difference being the method of determining the game outcome. Commonly, Class II gaming devices utilize the game of bingo as the basis for determining a winning outcome where the ball draw is performed remotely by a network or central determination server (alternative games may be used for determining game outcomes, such as through a lottery drawing of a finite set of numbers, if permitted by the licensing jurisdiction). Class II gaming systems are commonly referred to as central determination systems wherein pools and sub-pools of game outcomes are determined by a central server (or gaming device) and distributed amongst a set of networked gaming devices. The distribution step may be on demand, such as when a gaming device receives a game request, or sets of game outcomes may be distributed to the various networked gaming devices in which case the game processor of the requesting gaming device may select a game outcome from the set of game outcomes, such as by using an RNG or other selection process.

Additionally, Class II gaming devices, such as a bingo-based gaming device may have multiple displays, such as are shown in FIG. 2A wherein one of the displays, such as display 213 of FIG. 2A, may be used to display one or more electronic bingo cards and one or more ball drawings after a game has been initiated in accordance with the game outcome that has been provided to the gaming device by a central determination server. In the case, as in FIG. 2A, where the primary display comprises a set of reels, game processor 301 converts the centrally-determined game outcome to a corresponding value outcome of the reel-based game as shown in FIG. 2A and operates the reel-based game as described above and with respect to the figures. In one or more embodiments, when a player enters a wager on both base game 103, and any side game that may be included, and enters 'PLAY', a game play request may be transferred to central determination server 405 which may provide a single game outcome to the respective gaming machine 200 and game processor 301 may initiate a game presentation corresponding to the game outcome provided by server 405.

In one or more embodiments, coding may be implemented and stored in memory 303 and/or RAM, executable by game processor 301 to control game operation, display content, lighting, and audio through video, audio, reel drive motor controllers (for mechanical reels), and lighting controllers.

While the primary display has been depicted as displaying a set of reels, in one or more base game embodiments, base game 103 may comprise a card-based game (e.g. various poker variations) wherein each indicia location corresponds to a card that may be randomly or pseudo-randomly drawn (in which case, stacked wild symbols may be applied to produce a winning outcome or a larger award such as to complete three aces, etc.) Base game indicia (or card values) may also have specially designated symbols on various playing cards that trigger various events including a feature game, re-spins, multipliers, etc.

Also, while gaming machine 200 has been described as a stand-alone or networked game device, in one or more embodiments gaming machine 200 may be operable in a tournament or community gaming mode wherein players may compete for one or more awards or triggering of special features. For example, in one or more example configurations, one or more banks of gaming machines 200 may be networked connected to an overhead display which may display a feature game and when triggered, the player triggering the feature game may be indicated on the overhead display as the wheel-based game is played. For example, an additional wager may be required to activate and potentially win a wheel bonus which may be triggered by a specially designated symbol on the base game reels, and when triggered, the wheel bonus may provide an opportunity to win additional awards or provide interactive features with base game 103 (e.g. multipliers, free spins, etc.)

In another example, base game 103 may be played conventionally with payouts according to paytable 105 and players who are linked in a community game may compete against each other during each play for additional awards. For instance, of the competing players, the player with the highest award on a single play or cumulative play during a selected period may receive a first award, a player with the second highest award may receive a second award, etc. In one or more embodiments, the base game outcome (e.g. reel or card game outcome) and respective player identifiers may be displayed on an overhead screen, along with the awards paid to each participating player. In one or more embodiments, the participating players may be required to pay an additional fee to participate (e.g. a network inquiry to play in the community game) may be made on a player tracking display, player acceptance including a debit of the player's account or gaming device credit meter, and a community game controller may transmit a message to each participating player advising of their participation. In one or more embodiments, a player's highest game outcome occurring during a selected time span may be used by the community game controller as the player's entry into the community competition or tournament.

Figure 4:
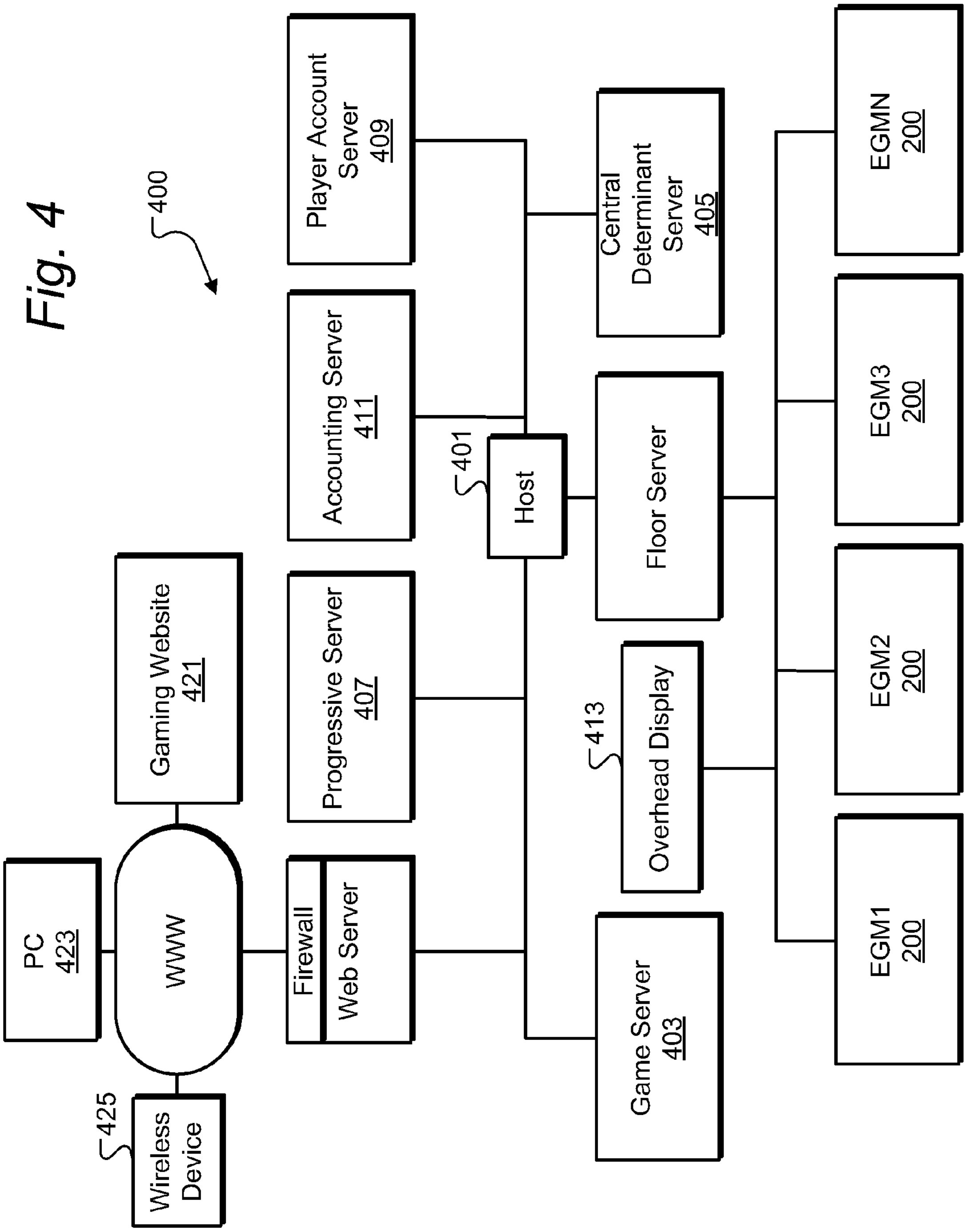
FIG. 4 illustrates an example gaming network including one or more gaming machines with dual game play in accordance with one or more embodiments.

Referring to FIG. 4, a block diagram of example networked gaming system 400 associated with one or more gaming facilities is shown including one or more networked gaming machines 200 with base game 103 in accordance with one or more embodiments. With reference to FIG. 4, while a few servers have been shown separately, they may be combined or split into additional servers having additional capabilities.

As shown, networked gaming machines 200 (EGM1-EGMN) and one or more overhead displays 413 may be network connected and enable the content of one or more displays of gaming machines 200 to be mirrored or replayed on an overhead display. For example, the primary display content may be stored by the display controller or game processor 301 and transmitted through network controller 307 to the overhead display controller either substantially simultaneously or at a subsequent time according to either periodic programming executed by game processor 301 or a triggering event, such as a jackpot or large win, at a respective gaming machine 200. In the event that gaming machines 200 have cameras installed, the respective player's video images may be displayed on overhead display 413 along with the content of the player's display 100 and any associated audio feed.

In one or more embodiments, game server 403 may provide server-based games and/or game services to network connected gaming devices, such as gaming machines 200 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e.g. game personalizing selections or options). For example, the player tracking display may be programmed to display a player menu that may include a choice of personalized gaming selections that may be applied to a gaming machine 200 being played by the player.

In one or more embodiments, the player menu may be programmed to display after a player inserts a player card into the card reader. When the card reader is inserted, an identification may be read from the card and transmitted to player account server 409. Player account server 409 transmits player information through network controller 307 to user interface 209 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 301 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Blackberry cell phone, Apple iPhone, personal data assistant (PDA), iPad, etc.). To enter the website, a player may log in with a user name (that may be associated with the player's account information stored on player account server 409 or be accessible by a casino operator to obtain player data and provide promotional offers), play various games on the website, make various personalizing selections and save the information, so that during a next gaming session at a casino establishment, the player's playing data and personalized information may be associated with the player's account and accessible at the player's selected gaming machine 200.

Referring generally to the forgoing description, as used herein the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures (Eighth Edition, August 2001 as revised September 2007), Section 2111.03. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). The term 'presentation' as used herein is meant to refer to the display of any image and/or video performance and/or the performance of one or more sound bites or audio tracks (such as digital or analog sound tracks or information stored on a memory device and processed by an audio controller to emit sound through a speaker) whether in an attract mode or as part of a game presentation or outcome.

The above described example embodiments are intended to illustrate the principles of the invention, but not to limit the scope of the invention. Various other embodiments and modifications to these preferred embodiments may be made by those skilled in the art without departing from the scope of the present invention. For example, base game 103 may be centrally determined based on a lottery game.

The invention claimed is:

1. A gaming machine including:

(a) a processor;

(b) an acceptor operable to accept a physical item associated with a monetary value;

(c) a set of primary reels operable by the processor to randomly or pseudo-randomly obtain a primary game outcome by displaying an updated set of symbols in a matrix of symbol locations, the matrix of symbol locations having at least two rows extending along the horizontal dimension of a gaming display and at least two vertical columns extending along the vertical dimension of the gaming display, the set of symbols having a chance to include one or more winning patterns along one or more paylines;

(d) at least one multiple-location wild symbol associated with at least one reel and vertically spanning two or more symbol locations vertically adjacent in the matrix of symbol locations with the effect of changing all the spanned locations to count as any symbol in the game for forming winning patterns, the at least one multiple location wild symbol having a chance to appear in the updated set of symbols in either a first state in which the multiple location wild symbol is fully visible in the matrix of symbol locations, or a second state in which only a lower or upper portion of the multiple location wild symbol is shown in the matrix of symbol locations, with a remainder of the multiple location wild symbol appearing to be outside the matrix of symbol locations;

(e) the processor configured to nudge a reel upward or downward when the multiple location wild symbol appears in the second state in which a portion of the multiple location wild symbol is visible as part of the primary game outcome, to cause the entire multiple location wild symbol to be visible on the reel and fill corresponding symbol locations; and (f) the processor configured to pay an award for winning game outcomes, and in the event that the primary game outcome includes the at least one multiple location wild symbol, to re-spin the set of reels to obtain an additional game outcome and pay any additional winning game outcomes.

2. The gaming machine of claim 1, wherein in the event that another multiple location wild symbol appears in the additional game outcome, the re-spinning process is repeated until no additional multiple location wild symbols appear during a subsequent re-spin or all reels show a multiple location wild symbol.

3. The gaming machine of claim 1, wherein only the reels without the multiple location wild symbol are re-spun.

4. The gaming machine of claim 3, wherein the reels with the multiple location wild symbol are only locked if all the reels to the left are locked.

5. The gaming machine of claim 1, wherein the player receives a bonus multiplier that is randomly determined each time the player receives a re-spin.

6. The gaming machine of claim 1, wherein alternative game presentations are selected based at least in part on low frequency of historical occurrence.

7. A method for providing a wagering game through an electronic gaming machine, the method including:

(a) via an acceptor of the electronic gaming machine, accepting a physical item associated with a monetary value;

(b) controlling, with one or more processors, a set of primary reels to randomly or pseudo-randomly obtain a primary game outcome by displaying an updated set of symbols in a matrix of symbol locations, the matrix of symbol locations having at least two rows extending along the horizontal dimension of a gaming display and at least two vertical columns extending along the vertical dimension of the gaming display, the set of symbols having a chance to include one or more winning patterns along one or more paylines;

(c) wherein the set of primary reels includes at least one multiple location wild symbol associated with each reel and vertically spanning two or more symbol locations vertically adjacent in the matrix of symbol locations with the effect of changing all the spanned locations to count as any symbol in the game for forming winning patterns, the at least one multiple location wild symbol having a chance to appear in the updated set of symbols in either a first state in which the multiple location wild symbol is fully visible in the matrix of symbol locations, or a second state in which only a lower or upper portion of the multiple location wild symbol is shown in the matrix of symbol locations, with a remainder of the multiple location wild symbol appearing to be outside the matrix of symbol locations;

(d) nudging a reel upward or downward when the multiple location wild symbol appears in the second state in which a portion of the multiple location wild symbol is visible as part of the primary game outcome, to cause the entire multiple location wild symbol to be visible on the reel and fill corresponding symbol locations; and (e) paying an award for winning game outcomes, and in the event that the primary game outcome includes the at least one multiple location wild symbol, re-spinning the set of reels to obtain an additional game outcome and paying any additional winning game outcomes.

8. The method of claim 7, wherein in the event that another multiple location wild symbol appears in the additional game outcome, the re-spinning process is repeated until no additional multiple location wild symbols appear during a subsequent re-spin or all reels show a stacked wild symbol.

9. The method of claim 7, wherein only the reels without the multiple location wild symbol are re-spun.

10. The method of claim 9, wherein the reels with the multiple location wild symbol are only locked if all the reels to the left are locked.

11. The method of claim 7, wherein the player receives a bonus multiplier that is randomly determined each time the player receives a re-spin.

12. The method of claim 7, wherein alternative game presentations are selected based at least in part on low frequency of historical occurrence.

13. A tangible non-transitory computer readable media encoded with a program product, the program product including code executable by a gaming machine for:

(a) via an acceptor of the gaming machine, accepting a physical item associated with a monetary value;

(b) controlling a set of primary reels to randomly or pseudo-randomly obtain a primary game outcome by displaying an updated set of symbols in a matrix of symbol locations, the matrix of symbol locations having at least two rows extending along the horizontal dimension of a gaming display and at least two vertical columns extending along the vertical dimension of the gaming display, the set of symbols having a chance to include one or more winning patterns along one or more paylines;

(c) the set of primary reels including at least one multiple location wild symbol associated with each reel and vertically spanning two or more symbol locations vertically adjacent in the matrix of symbol locations with the effect of changing all the spanned locations to count as any symbol in the game for forming winning patterns, the at least one multiple location wild symbol having a chance to appear in the updated set of symbols in either a first state in which the multiple location wild symbol is fully visible in the matrix of symbol locations, or a second state in which only a lower or upper portion of the multiple location wild symbol is shown in the matrix of symbol locations, with a remainder of the multiple location wild symbol appearing to be outside the matrix of symbol locations;

(d) nudging a reel upward or downward when the multiple location wild symbol appears in the second state in which a portion of the multiple location wild symbol is visible as part of the primary game outcome, to cause the entire multiple location wild symbol to be visible on the reel and fill corresponding symbol locations; and (e) paying an award for winning game outcomes, and in the event that the primary game outcome includes the at least one multiple location wild symbol, re-spinning the set of reels to obtain an additional game outcome and paying any additional winning game outcomes.

14. The media of claim 13, wherein in the event that another multiple location wild symbol appears in the additional game outcome, the re-spinning process is repeated until no additional multiple location wild symbols appear during a subsequent re-spin or all reels show a multiple location wild symbol.

15. The computer readable media of claim 13, wherein only the reels without the multiple location wild symbol are re-spun.

16. The computer readable media of claim 13, wherein the player receives a bonus multiplier that is randomly determined each time the player receives a re-spin.

17. The computer readable media of claim 13, wherein alternative game presentations are selected based at least in part on low frequency of historical occurrence.

* * * * *